United States Patent
Aoki et al.

(10) Patent No.: US 7,955,428 B2
(45) Date of Patent: Jun. 7, 2011

(54) BIODEGRADABLE COMPOSITION, PROCESSED BIODEGRADABLE ARTICLE SUCH AS FOOD CONTAINER, AND METHOD OF PRODUCING THE SAME

(75) Inventors: Kazuhiko Aoki, Osaka (JP); Yasuhiro Ikeo, Osaka (JP)

(73) Assignee: Nuclear Engineering, Ltd., Osaka-shi (JP)

( * ) Notice: Subject to any disclaimer, the term of this patent is extended or adjusted under 35 U.S.C. 154(b) by 0 days.

(21) Appl. No.: 12/740,883

(22) PCT Filed: May 16, 2008

(86) PCT No.: PCT/JP2008/059088
§ 371 (c)(1),
(2), (4) Date: Apr. 3, 2010

(87) PCT Pub. No.: WO2009/057339
PCT Pub. Date: May 7, 2009

(65) Prior Publication Data
US 2010/0236972 A1  Sep. 23, 2010

(30) Foreign Application Priority Data
Nov. 2, 2007 (JP) .................. 2007-286602

(51) Int. Cl.
C08L 3/02 (2006.01)
C08L 1/02 (2006.01)
C08L 89/00 (2006.01)
(52) U.S. Cl. .............. 106/137.1; 106/126.2; 106/126.3; 106/143.1

(58) Field of Classification Search ............... 106/126.2, 106/126.3, 137.1, 143.1
See application file for complete search history.

(56) References Cited

U.S. PATENT DOCUMENTS

| | | | |
|---|---|---|---|
| 5,505,866 A * | 4/1996 | Bacon et al. .................. 510/517 |
| 5,545,485 A | 8/1996 | Hashitani et al. | |
| 5,665,152 A * | 9/1997 | Bassi et al. ................. 106/145.1 |

FOREIGN PATENT DOCUMENTS

| | | |
|---|---|---|
| JP | 5-57833 A | 3/1993 |
| JP | 5-278738 A | 10/1993 |
| JP | 5-320401 A | 12/1993 |
| JP | 6-248040 A | 9/1994 |
| JP | 7-17571 A | 1/1995 |
| JP | 7-133435 A | 5/1995 |
| JP | 9-500924 A | 1/1997 |
| JP | 2001-517253 A | 10/2001 |

(Continued)

OTHER PUBLICATIONS

International Search Report of PCT/JP2008/059088, mailing date of Jul. 29, 2008.

(Continued)

Primary Examiner — David M Brunsman
(74) Attorney, Agent, or Firm — Westerman, Hattori, Daniels & Adrian, LLP (57) ABSTRACT

The present invention provides a processed biodegradable article having excellent water resistance and rigidity, which can be used as a food container, and a biodegradable composition required to produce the processed biodegradable article comprising 15-75% by mass starch, 5-50% by mass protein, 3-50% by mass cellulose fiber, 0.5-20% by mass polyphenols such as pyrogallol and gallic acid, and 0-5% by mass sodium chloride.

9 Claims, 1 Drawing Sheet

FOREIGN PATENT DOCUMENTS

| | | |
|---|---|---|
| JP | 2002-355932 A | 12/2002 |
| JP | 2004-137726 A | 5/2004 |
| JP | 2005-23262 A | 1/2005 |
| JP | 2005-119708 A | 5/2005 |
| JP | 2006-70179 A | 3/2006 |
| JP | 2009-114264 A | 5/2009 |

OTHER PUBLICATIONS

JP Decision to Grant Patent of JP 2007-286602, mailing date of Jan. 29, 2008.

* cited by examiner

Fig. 1

BIODEGRADABLE COMPOSITION, PROCESSED BIODEGRADABLE ARTICLE SUCH AS FOOD CONTAINER, AND METHOD OF PRODUCING THE SAME

This application is a 371 of PCT/JP2008/059088, filed May 16, 2008.

TECHNICAL FIELD

The present invention relates to a biodegradable composition, a processed biodegradable article such as a food container, and a method of producing the same.

BACKGROUND ART

Heretofore, a lot of biodegradable resins and biodegradable compositions, containing, as main components, biodegradable resins such as polylactic acid and fatty acid polyester as well as natural materials such as starch, have hitherto been proposed, and processed biodegradable articles using these biodegradable resins and biodegradable compositions have been provided.

For example, JP-A-Hei07-17571 (Patent Document 1) discloses a biodegradable buffer material which contains starch as a main component, and is obtained by adding vegetable fibers and/or protein, followed by blow molding. JP-A-2005-119708 (Patent Document 2) discloses a biodegradable resin composition obtained by blending starch and polyol, monosaccharide or oligosaccharide, and protein. JP-A-Hei05-320401 (Patent Document 3) discloses a biodegradable molded article obtained by blending wheat flour, starch and cellulose, followed by foaming and further firing.

However, when natural materials such as starch are used, the resultant product often has poor water resistance and tends to have poor strength. Therefore, JP-A-Hei05-278738 (Patent Document 4) and JP-A-Hei05-57833 (Patent Document 5) and JP-A-2002-355932 (Patent Document 6) each discloses a method of coating the surface of a processed article molded from a biodegradable composition with a water-resistant resin. However, according to this method, coating must be conducted again, resulting in increase of the number of steps.

On the other hand, JP-A-Hei06-248040 (Patent Document 7) discloses, as a biodegradable composition having improved impact resistance and improved heat resistance, a composition composed of phenols, sugar and starch. This composition is obtained by applying formation of a resin by the reaction between phenols and sugar. JP-A-2004-137726 (Patent Document 8) discloses a composition for a biodegradable gravel product, which is composed of starch and tannin or polyphenol and, furthermore, protein and a crushed mineral powder, and a divalent metal powder having the chelate mordanting effect with tannin or polyphenol. However, this composition is obtained by supporting a condensation compound of a metal salt and a polyphenol on starch and also contains a divalent metal salt, and therefore it is not suitable for applications such as tablewares. Also, tannins and polyphenols used herein are condensed tannins such as persimmon tannin, tea tannin and bark tannin, and are suitable for use as a substitute of gravel, but are not suitable for processed articles such as tablewares because condensed tannins and divalent metal salts are used and therefore the strength becomes too higher. Furthermore, since the metal salts are used, metals thereof remain after decomposition and thus it is considered that an adverse influence may be exerted on the environment.

JP-A-2005-23262 (Patent Document 9) discloses a biodegradable composition using main materials obtained by finely dividing 100% natural materials, for example, grains such as maize, dietary fibers such as weeds, and sugar cane, and natural binders such as persimmon tannin and konjac powder. However, a specific composition ratio is unclear and also it is unclear whether or not the product is actually produced. Since this composition is composed only of natural materials such as cereals, quality of the resultant molded article is not maintained and the molded article is not suitable for use as an industrial product.

Furthermore, translation of PCT application No. 9-500924 (Patent Document 10) discloses a biodegradable composition containing starch, protein, cellulose, phenol and tannin, and tall oil or wax. However, this composition contains tall oil or wax, there is a fear of ooze of wax or the like. Therefore, the composition is suitable for production of woodworks. However, when applied to processed articles such as tablewares, there is a possibility that problems for safety may arise.

Patent Document 1: JP-A-Hei07-17571
Patent Document 2: JP-A-2005-119708
Patent Document 3: JP-A-Hei05-320401
Patent Document 4: JP-A-Hei05-278738
Patent Document 5: JP-A-Hei05-57833
Patent Document 6: JP-A-2002-355932
Patent Document 7: JP-A-Hei06-248040
Patent Document 8: JP-A-2004-137726
Patent Document 9: JP-A-2005-23262
Patent Document 10: Translation of PCT application No. 9-500924

DISCLOSURE OF THE INVENTION

Problems to be Solved by the Invention

The present invention has been made in light of the above background arts and it is an object of the invention to provide a processed article having satisfactory water resistance and strength.

Means for Solving the Problems

The present inventors have intensively studied so as to solve the above problem and have found that the above object can be achieved by using a composition containing four components of starch, protein, cellulose fiber and polyphenols, and also containing sodium chloride added thereto if needed. Thus, the present invention has been completed.

EFFECTS OF THE INVENTION

According to the present invention, a processed biodegradable article having satisfactory water resistance and strength can be obtained. Therefore, various daily products, which require water resistance, such as cups, dishes, bowls, bottles and food containers are provided.

BEST MODE FOR CARRYING OUT THE INVENTION

The biodegradable composition of the present invention includes 15% by mass or more and 75% by mass or less of starch, 5% by mass or more and 50% by mass or less of protein, 3% by mass or more and 50% by mass or less of cellulose fiber, 0.5% by mass or more and 20% by mass or less of polyphenols, and 0% by mass or more and 5% by mass or less of sodium chloride.

The starch used in the present invention may be not only a starch derived from a natural product (natural starch), but also a chemically modified starch obtained by chemically treating a natural starch, followed by chemical modification. Also, these starches can be appropriately used in combination.

The natural starch is a starch obtained from various plants, such as maize starch, potato starch, sweet potato starch, wheat starch, rice starch, tapioca starch, sorghum starch or the like, and plants as origins are not limited. Also, the content of amylose and the content of amylopectin contained in the starch are not particularly limited, and starch having increased content of amylose such as high-amylose maize starch may also be used. In the present invention, starches may be used alone, or two or more of natural starches may be used.

The chemically modified starch is obtained by introducing a substituent into a hydroxyl group of glucose constituting the starch. The substituent is not particularly limited, and also the kind of the natural starch as the starch to be modified is not particularly limited. Examples of the chemically modified starch include hydroxypropyl starch, carboxymethyl starch, acetylated high-amylose starch, starch acetate, starch maleate, starch octenylsuccinate, starch succinate, starch phthalate, hydroxypropyl high-amylose starch, crosslinked starch, starch phosphate, and hydroxypropyl distarch phosphate. These chemically modified starches may be used alone, or two or more kinds thereof may be used in combination. The crosslinked starch as used herein means those obtained by crosslinking starch molecules using various crosslinking agents such as phosphoric acid chloride, epichlorohydrin, and phosphoric acid derivative.

The protein used in the present invention may be any of a plant-derived protein, an animal-derived protein and a synthetic protein. Examples of the plant-derived protein (vegetable protein) include proteins obtained from various beans and grains, such as soybean protein, wheat protein and rice protein. Examples of the animal-derived protein (animal protein) include proteins derived from various animals, birds and fishes, such as milk protein. These proteins may be not only crude proteins which are obtained by extraction only and are not purified, but also concentrated proteins obtained by concentration. Examples of the plant-derived protein include soybean concentrated proteins, while examples of the animal-derived protein include concentrated milk proteins. On the other hand, the protein may also be a protein obtained by purifying the crude protein. Examples of the plant-derived protein include gluten, zein, hordein, avenin and kafirin, while examples of the animal-derived protein include casein, albumin, collagen, gelatin and keratin. These proteins can be used alone, or two or more kinds thereof can be used in combination.

The cellulose fibers used in the present invention may be either natural or artificial cellulose fibers. Examples of the naturally derived cellulose fibers include those derived from various plants, for example, seeds coats of grains such as rice husks, or grasses, wood, straws, sugar cane, cotton, leaves, husks of maize, bagasse obtained from cane trash, and processed products such as newspaper. These cellulose fibers are used after drying straws, seed coats of grains or the like, loosening them in a fibrous state and cutting them in an arbitrary suitable length. The cellulose fibers, which can be used, are those measuring about 1 to 100 µm in thickness and about 10 µm to 30 mm in length, and can be appropriately determined depending on applications and required strength of the processed article.

The polyphenols used in the present invention may be a compound having a phenolic hydroxyl group therein, or may be either a low-molecular weight polyphenol having a molecular weight of about hundred to thousand or a high-molecular weight polyphenol having a molecular weight higher than that of the low-molecular weight polyphenol. Examples of the polyphenols include pyrogallol, gallic acid and tannin, and these polyphenols are used alone, or two or more kinds thereof are used in combination. Although tannin is roughly divided into a condensed tannin such as persimmon tannin or tea tannin, and a soluble tannin (hydrolysable tannin), a soluble tannin capable of producing gallic acid or ellagic acid as a result of hydrolysis is preferred in the present invention. In order to uniformly keep quality, a low-molecular weight polyphenol such as pyrogallol or gallic acid obtained by hydrolyzing the soluble tannin is preferably used. This is because the low-molecular weight polyphenol, which is chemically single and has stable quality, can be employed.

The biodegradable composition of the present invention contains starch, protein, cellulose fiber and polyphenols as essential components, and also contains 15% by mass or more and 75% by mass or less of starch, 5% by mass or more and 50% by mass or less of protein, 3% by mass or less 50% by mass or less of cellulose fiber, and 0.5% by mass or more and 20% by mass or less of polyphenols.

Although the biodegradable composition of the present invention is composed of these four components, the biodegradable composition may be sometimes blended with sodium chloride. Blending of sodium chloride enables so-called "firm texture" when wheat noodles are made, and thus a processed biodegradable article having higher strength (rigidity) can be obtained even if the processed article has a small thickness. When sodium chloride is blended with the composition, the content thereof is 5% by mass or less.

The biodegradable composition of the present invention is a composition containing starch and protein as a base, and it is important to blend the base with cellulose fibers and polyphenols. When the content of the polyphenols is less than 0.5% by mass, satisfactory kneading cannot be conducted or it becomes difficult to mold the composition. In contrast, when the content of the polyphenols is more than 20% by mass, moldability deteriorates. When the content of the cellulose fibers is less than 3% by mass or more than 50% by mass, it becomes impossible to mold the composition.

In the present invention, a mass ratio of starch/protein is preferably 1 or more and 12 or less, and more preferably 1 or more and 3 or less. For example, like wheat starch and wheat protein, when starch and protein, which are derived from the same plant, are used, the mass ratio of the starch to the protein (starch/protein) can be adjusted to 3 or more. At this time, when the content of the protein is less than 5% by mass, moldability deteriorates. When the mass ratio of the starch to the protein exceeds 3 and therefore the content of the starch increases, satisfactory kneading cannot be conducted and moldability tends to deteriorate. Therefore, when kneading cannot be conducted and moldability is inferior, the amount of the protein to be blended may be increased. When the mass ratio of the starch to the protein is in the range of 1 or more and 3 or less, moldability can be ensured by adjusting the amount of the protein to 15% by mass or more, and preferably 20% by mass or more. On the other hand, when the amount of the protein exceeds 50% by mass, moldability by press tends to deteriorate.

The amount of the cellulose fibers increased as compared with that of the protein, flexibility is lost and an adverse influence is exerted on moldability. Therefore, as the mass ratio of the starch to the protein is increased, the amount of the cellulose fibers is preferably decreased. Specifically, the mass ratio of starch/protein exceeds 2, the amount of the cellulose fibers is preferably adjusted to 30% by mass or less. When the mass ratio of starch/protein exceeds 1 and is 2 or less, the amount of the cellulose fibers is preferably adjusted to 40% by mass or less. Furthermore, when the mass ratio of starch/protein is 1, the amount of the cellulose fibers is preferably adjusted to 50% by mass or less. It goes without saying that satisfactory water resistance and strength can be sometimes obtained depending on the amounts of the cellulose fibers and the polyphenols even if the mass ratio of starch/protein is not within the above range.

The biodegradable composition of the present invention contains starch, protein, cellulose fibers and polyphenols as well as requisite sodium chloride as essential constituent components, and it is not necessary to be blended with so-called plasticizers, softeners and metal salts (excluding a sodium salt). As long as the physical properties such as strength and flexibility of the processed article of the present invention do not essentially vary, it is possible to blend with additives such as colorants and stabilizers for preventing heat coloration.

The processed biodegradable article of the present invention can be produced by the following procedure. That is, the biodegradable composition is mixed with water, followed by well kneading under stirring using a mixer or the like. At this time, it is not satisfactory that the respective components are merely mixed with water, and it is preferred to knead them to an extent that the hardness becomes the hardness of the earlobe, and preferably so-called the firm texture of noodles is obtained.

Regarding the mixing ratio of water to the composition, the amount of water is 10% by mass or more and 100 parts by mass or less, and preferably 30 parts by mass or more and 85 parts by mass or less, based on 100 parts by mass of the composition. However, the mixing ratio is appropriately adjusted so as to obtain the above hardness. When the amount of water is less than 10 parts by mass, the mixture becomes powdery and cannot be satisfactorily kneaded. In contrast, when the amount is more than 100 parts by mass, the amount of water is too large to obtain proper hardness in many cases.

The composition kneaded with water is formed into the desired shape such as cups, dishes, chopsticks, forks, spoons and bottles. A forming method is not particularly limited and includes, for example, a method of drawing the composition into a sheet and then formed using a press. After forming, the thickness varies depending on the desired processed article, and is about 0.5 to 1 mm in the case of cups and dishes. When the resulting molded article has a thickness within the above range, it can be suitable for practical use.

The molded article thus formed is then heat-treated at a temperature of 120° C. or higher and 180° C. or lower, and preferably from 120° C. to 160° C. Satisfactory strength and water resistance can be obtained by this heat treatment. When the temperature is low, satisfactory strength and water resistance are not obtained. Even when the temperature is higher than 180° C., a molded article having satisfactory strength is obtained. However, the color changed to brown like burn color and there is great fear of reduction in commercial value.

The resultant processed biodegradable article withstands hot water, and also can be used for tablewares such as coffee cups to which heat resistance and water resistance are required. The processed biodegradable article has a tensile strength of at least 6 MPa and about 10 MPa or more and about 25 MPa or more, and also can be applied for tablewares such as chopsticks, forks, knives and spoons. Since oil, wax and plasticizers are not used, ooze of oil or wax does not occur and thus tablewares having excellent safety can be obtained. Since polyphenols such as tannin and metal salts are not used in combination, the metal salts are not discharged due to decomposition and also there is no fear of environmental pollution.

The composition of the present invention can be used not only as the above-described tablewares such as cups and dishes, but also as food containers such as lunch boxes, typically Tupperware®; and daily necessities such as take-out packaging containers, pencil cases, desk pads and accessory cases. If necessary, a water-resistant resin can also be coated.

The present invention will be described in more detail by way of the following example. As a matter of course, the present invention is not limited to the following example.

Example 1

First, the mixing/press performance and moldability in mold of a composition were evaluated using starch, protein, cellulose fibers, polyphenol and sodium chloride.

Maize starch ("Cornstarch", manufactured by Wako Pure Chemical Industries, Ltd.), wheat protein ("Fumeritt A", manufactured by Nagata Group), cellulose fibers (KC FLOCK #100 mesh or #200, manufactured by Nippon Paper Chemicals), pyrogallol ("Pyrogallol powder", manufactured by Iwate Chemical Co., Ltd.), gallic acid ("Gallic acid powder" manufactured by Iwate Chemical Co., Ltd.), sodium chloride ("Salt" available from The Salt Industry Center of Japan) were blended as shown in Table 1 and Table 2, and a predetermined amount of water was added, and then the mixture was mixed and kneaded at a normal temperature using a rotational-revolutional type mixer until so-called "firm texture" is achieved. This kneaded mixture was drawn into a sheet having a thickness of about 3 mm by a twin-screw press and then molded into a cup having a thickness of 1 mm at a temperature of 150° C. using a mold press. At this time, mixing/press performance and moldability in mold were evaluated. The results are shown in Tables 1-1 to 2-3. The results shown in Tables 1-1 to 1-3 are obtained by evaluation with the amount of cellulose fibers to be blended, while those shown in Tables 2-1 to 2-3 are obtained by evaluation with the amount polyphenol to be blended. The mixing/press performance was evaluated whether the composition and water could be satisfactorily kneaded or not, while the moldability in mold was evaluated whether or not press moldability was satisfactory or not.

TABLE 1-1

| Test No. | Components [parts by mass] | | | | | | | Phenol | | | Amount of water based on 100 of composition (parts by mass) | Mixing/press performance | Moldability in mold |
|---|---|---|---|---|---|---|---|---|---|---|---|---|---|
| | Starch | | | | Wheat protein | Cellulose | Sodium chloride | Pyrogallol | Persimmon tannin | Gallic acid | | | |
| | Maize | Potato | Rice | Wheat | | | | | | | | | |
| 152 | 50.0 | — | — | — | 50.0 | 0.0 | 0.0 | 0.0 | — | — | 50.0 | ○ | X |
| 124 | 66.5 | — | — | — | 33.5 | 0.0 | 0.0 | 0.0 | — | — | 60.0 | ○ | X |
| 106 | 75.0 | — | — | — | 25.0 | 0.0 | 0.0 | 0.0 | — | — | 60.0 | ○ | X |
| 153 | 49.5 | — | — | — | 49.5 | 0.0 | 0.0 | 1.0 | — | — | 49.5 | ○ | X |
| 125 | 65.8 | — | — | — | 33.2 | 0.0 | 0.0 | 1.0 | — | — | 59.4 | ○ | X |
| 103 | 74.3 | — | — | — | 24.8 | 0.0 | 0.0 | 1.0 | — | — | 59.4 | ○ | X |
| 126 | 64.2 | — | — | — | 32.4 | 0.0 | 2.4 | 1.0 | — | — | 53.1 | ○ | X |
| 127 | 63.3 | — | — | — | 31.9 | 0.0 | 0.0 | 4.8 | — | — | 52.4 | ○ | X |
| 102 | 71.4 | — | — | — | 23.8 | 0.0 | 0.0 | 4.8 | — | — | 57.1 | ○ | X |
| 154 | 45.5 | — | — | — | 45.5 | 0.0 | 0.0 | 9.1 | — | — | 45.5 | ○ | X |
| 128 | 60.5 | — | — | — | 30.5 | 0.0 | 0.0 | 9.1 | — | — | 50.0 | ○ | X |
| 101 | 68.2 | — | — | — | 22.7 | 0.0 | 0.0 | 9.1 | — | — | 50.0 | ○ | X |
| 155 | 40.0 | — | — | — | 40.0 | 0.0 | 0.0 | 20.0 | — | — | 28.0 | ○ | X |
| 65 | 38.5 | — | — | — | 38.5 | 3.8 | 0.0 | 19.2 | — | — | 30.8 | ○ | ○ |
| 41 | 57.8 | — | — | — | 29.1 | 4.3 | 0.0 | 8.7 | — | — | 56.5 | ○ | ○ |
| 11 | 65.2 | — | — | — | 21.7 | 4.3 | 0.0 | 8.7 | — | — | 56.5 | ○ | ○ |
| 66 | 42.6 | — | — | — | 42.6 | 4.3 | 0.0 | 10.6 | — | — | 34.0 | ○ | ○ |
| 42 | 60.5 | — | — | — | 30.5 | 4.5 | 0.0 | 4.5 | — | — | 59.1 | ○ | ○ |
| 12 | 68.2 | — | — | — | 22.7 | 4.5 | 0.0 | 4.5 | — | — | 59.1 | ○ | ○ |
| 67 | 47.2 | — | — | — | 47.2 | 4.7 | 0.0 | 0.9 | — | — | 37.7 | ○ | ○ |
| 43 | 62.7 | — | — | — | 31.6 | 4.7 | 0.0 | 0.9 | — | — | 61.3 | ○ | ○ |
| 13 | 70.8 | — | — | — | 23.6 | 4.7 | 0.0 | 0.9 | — | — | 61.3 | ○ | ○ |
| 64 | 43.1 | — | — | — | 43.1 | 12.9 | 0.0 | 0.9 | — | — | 43.1 | ○ | ○ |
| 40 | 57.3 | — | — | — | 28.9 | 12.9 | 0.0 | 0.9 | — | — | 64.7 | ○ | ○ |
| 10 | 64.7 | — | — | — | 21.6 | 12.9 | 0.0 | 0.9 | — | — | 64.7 | ○ | ○ |
| 9 | 57.7 | — | — | — | 19.2 | 15.4 | 0.0 | 7.7 | — | — | 53.8 | ○ | ○ |
| 36 | 50.7 | — | — | — | 25.6 | 19.1 | 3.8 | 0.8 | — | — | 64.9 | ○ | ○ |
| 31 | 51.2 | — | — | — | 25.8 | 19.2 | 1.9 | 1.9 | — | — | 65.4 | ○ | ○ |
| 29 | 51.2 | — | — | — | 25.8 | 19.2 | 0.0 | 3.8 | — | — | 53.8 | ○ | ○ |
| 6 | 57.7 | — | — | — | 19.2 | 19.2 | 0.0 | 3.8 | — | — | 65.4 | ○ | ○ |
| 33 | 51.3 | — | — | — | 25.8 | 19.3 | 1.9 | 1.6 | — | — | 65.6 | ○ | ○ |
| 34 | 51.7 | — | — | — | 26.1 | 19.4 | 1.9 | 0.8 | — | — | 66.1 | ○ | ○ |

TABLE 1-2

| Test No. | Components [parts by mass] | | | | | | | Phenol | | | Amount of water based on 100 of composition (parts by mass) | Mixing/press performance | Moldability in mold |
|---|---|---|---|---|---|---|---|---|---|---|---|---|---|
| | Starch | | | | Wheat protein | Cellulose | Sodium chloride | Pyrogallol | Persimmon tannin | Gallic acid | | | |
| | Maize | Potato | Rice | Wheat | | | | | | | | | |
| 61 | 38.7 | — | — | — | 38.7 | 19.4 | 1.9 | 1.2 | — | — | 48.4 | ○ | ○ |
| 27 | 51.8 | — | — | — | 26.1 | 19.5 | 1.9 | — | 0.8 | — | 66.1 | ○ | ○ |
| 28 | 51.8 | — | — | — | 26.1 | 19.5 | 1.9 | — | — | 0.8 | 66.1 | ○ | ○ |
| 37 | — | 51.8 | — | — | 26.1 | 19.5 | 1.9 | 0.8 | — | — | 66.1 | ○ | ○ |
| 38 | — | — | 51.8 | — | 26.1 | 19.5 | 1.9 | 0.8 | — | — | 66.1 | ○ | ○ |
| 123 | 52.2 | — | — | — | 26.3 | 19.6 | 2.0 | 0.0 | — | — | 66.7 | ○ | X |
| 30 | 52.2 | — | — | — | 26.3 | 19.6 | 0.0 | 2.0 | — | — | 66.7 | ○ | ○ |
| 7 | 58.8 | — | — | — | 19.6 | 19.6 | 0.0 | 2.0 | — | — | 54.9 | ○ | ○ |
| 32 | 52.3 | — | — | — | 26.4 | 19.7 | 0.0 | 1.7 | — | — | 66.9 | ○ | ○ |
| 63 | 39.7 | — | — | — | 39.7 | 19.8 | 0.0 | 0.8 | — | — | 47.6 | ○ | ○ |
| 39 | 52.8 | — | — | — | 26.6 | 19.8 | 0.0 | 0.8 | — | — | 67.5 | ○ | ○ |
| 8 | 59.5 | — | — | — | 19.8 | 19.8 | 0.0 | 0.8 | — | — | 67.5 | ○ | ○ |
| 2 | 60.7 | — | — | — | 18.7 | 19.8 | 0.0 | 0.8 | — | — | 67.5 | ○ | ○ |
| 1 | — | — | — | 73.0 | 6.3 | 19.8 | 0.0 | 0.8 | — | — | 67.5 | ○ | ○ |
| 62 | 39.5 | — | — | — | 39.5 | 19.8 | 0.0 | 1.2 | — | — | 49.4 | ○ | ○ |
| 156 | 40.0 | — | — | — | 40.0 | 20.0 | 0.0 | 0.0 | — | — | 48.0 | X | — |
| 122 | 53.2 | — | — | — | 26.8 | 20.0 | 0.0 | 0.0 | — | — | 68.0 | ○ | X |
| 105 | 60.0 | — | — | — | 20.0 | 20.0 | 0.0 | 0.0 | — | — | 68.0 | ○ | X |
| 26 | 45.9 | — | — | — | 23.1 | 24.1 | 0.0 | 6.9 | — | — | 51.7 | ○ | ○ |
| 157 | 25.0 | — | — | — | 25.0 | 25.0 | 0.0 | 25.0 | — | — | 62.5 | X | — |
| 4 | 51.7 | — | — | — | 17.2 | 27.6 | 0.0 | 3.4 | — | — | 58.6 | ○ | ○ |
| 55 | 27.8 | — | — | — | 27.8 | 27.8 | 0.0 | 16.7 | — | — | 69.4 | ○ | ○ |
| 3 | 49.2 | — | — | — | 16.4 | 27.9 | 0.0 | 6.6 | — | — | 55.7 | ○ | ○ |
| 5 | 53.2 | — | — | — | 17.7 | 28.4 | 0.0 | 0.7 | — | — | 60.3 | ○ | ○ |

TABLE 1-2-continued

| Test No. | Components [parts by mass] Starch Maize | Potato | Rice | Wheat | Wheat protein | Cellulose | Sodium chloride | Phenol Pyrogallol | Persimmon tannin | Gallic acid | Amount of water based on 100 of composition (parts by mass) | Mixing/press performance | Moldability in mold |
|---|---|---|---|---|---|---|---|---|---|---|---|---|---|
| 104 | 53.6 | — | — | — | 17.9 | 28.6 | 0.0 | 0.0 | — | — | 60.7 | ○ | X |
| 56 | 29.4 | — | — | — | 29.4 | 29.4 | 0.0 | 11.8 | — | — | 73.5 | ○ | ○ |
| 57 | 31.3 | — | — | — | 31.3 | 31.3 | 0.0 | 6.3 | — | — | 78.1 | ○ | ○ |
| 54 | 26.3 | — | — | — | 26.3 | 31.6 | 0.0 | 15.8 | — | — | 65.8 | ○ | ○ |
| 59 | 31.9 | — | — | — | 31.9 | 31.9 | 3.2 | 1.0 | — | — | 79.8 | ○ | ○ |
| 24 | 42.9 | — | — | — | 21.6 | 32.3 | 0.0 | 3.2 | — | — | 45.2 | ○ | ○ |

TABLE 1-3

| Test No. | Components [parts by mass] Starch Maize | Potato | Rice | Wheat | Wheat protein | Cellulose | Sodium chloride | Phenol Pyrogallol | Persimmon tannin | Gallic acid | Amount of water based on 100 of composition (parts by mass) | Mixing/press performance | Moldability in mold |
|---|---|---|---|---|---|---|---|---|---|---|---|---|---|
| 58 | 32.6 | — | — | — | 32.6 | 32.6 | 0.0 | 2.1 | — | — | 81.6 | ○ | ○ |
| 60 | 33.0 | — | — | — | 33.0 | 33.0 | 0.0 | 1.0 | — | — | 82.5 | ○ | ○ |
| 25 | 44.0 | — | — | — | 22.2 | 33.1 | 0.0 | 0.7 | — | — | 56.3 | ○ | ○ |
| 22 | 40.3 | — | — | — | 20.3 | 36.4 | 0.0 | 3.0 | — | — | 54.5 | ○ | ○ |
| 21 | 38.0 | — | — | — | 19.1 | 37.1 | 0.0 | 5.7 | — | — | 51.4 | ○ | ○ |
| 23 | 41.3 | — | — | — | 20.8 | 37.3 | 0.0 | 0.6 | — | — | 52.8 | ○ | ○ |
| 121 | 41.6 | — | — | — | 20.9 | 37.5 | 0.0 | 0.0 | — | — | 53.1 | ○ | X |
| 51 | 19.6 | — | — | — | 19.6 | 47.1 | 0.0 | 13.7 | — | — | 58.8 | ○ | ○ |
| 151 | 26.3 | — | — | — | 26.3 | 47.4 | 0.0 | 0.0 | — | — | 73.7 | ○ | X |
| 52 | 23.8 | — | — | — | 23.8 | 47.6 | 0.0 | 4.8 | — | — | 66.7 | ○ | ○ |
| 53 | 24.9 | — | — | — | 24.9 | 49.8 | 0.0 | 0.5 | — | — | 69.7 | ○ | ○ |

TABLE 2-1

| Test No. | Components [parts by mass] Starch Maize | Potato | Rice | Wheat | Wheat protein | Cellulose | Sodium chloride | Phenol Pyrogallol | Persimmon tannin | Gallic acid | Amount of water based on 100 of composition (parts by mass) | Mixing/press performance | Moldability in mold |
|---|---|---|---|---|---|---|---|---|---|---|---|---|---|
| 106 | 75.0 | — | — | — | 25.0 | 0.0 | 0.0 | 0.0 | — | — | 60.0 | ○ | X |
| 124 | 66.5 | — | — | — | 33.5 | 0.0 | 0.0 | 0.0 | — | — | 60.0 | ○ | X |
| 152 | 50.0 | — | — | — | 50.0 | 0.0 | 0.0 | 0.0 | — | — | 50.0 | ○ | X |
| 123 | 52.2 | — | — | — | 26.3 | 19.6 | 2.0 | 0.0 | — | — | 66.7 | ○ | X |
| 105 | 60.0 | — | — | — | 20.0 | 20.0 | 0.0 | 0.0 | — | — | 68.0 | ○ | X |
| 122 | 53.2 | — | — | — | 26.8 | 20.0 | 0.0 | 0.0 | — | — | 68.0 | ○ | X |
| 156 | 40.0 | — | — | — | 40.0 | 20.0 | 0.0 | 0.0 | — | — | 48.0 | X | — |
| 104 | 53.6 | — | — | — | 17.9 | 28.6 | 0.0 | 0.0 | — | — | 60.7 | ○ | X |
| 121 | 41.6 | — | — | — | 20.9 | 37.5 | 0.0 | 0.0 | — | — | 53.1 | ○ | X |
| 151 | 26.3 | — | — | — | 26.3 | 47.4 | 0.0 | 0.0 | — | — | 73.7 | ○ | X |
| 53 | 24.9 | — | — | — | 24.9 | 49.8 | 0.0 | 0.5 | — | — | 69.7 | ○ | ○ |
| 23 | 41.3 | — | — | — | 20.8 | 37.3 | 0.0 | 0.6 | — | — | 52.8 | ○ | ○ |
| 5 | 53.2 | — | — | — | 17.7 | 28.4 | 0.0 | 0.7 | — | — | 60.3 | ○ | ○ |
| 25 | 44.0 | — | — | — | 22.2 | 33.1 | 0.0 | 0.7 | — | — | 56.3 | ○ | ○ |
| 36 | 50.7 | — | — | — | 25.6 | 19.1 | 3.8 | 0.8 | — | — | 64.9 | ○ | ○ |
| 34 | 51.7 | — | — | — | 26.1 | 19.4 | 1.9 | 0.8 | — | — | 66.1 | ○ | ○ |
| 27 | 51.8 | — | — | — | 26.1 | 19.5 | 1.9 | 0.8 | — | — | 66.1 | ○ | ○ |
| 28 | 51.8 | — | — | — | 26.1 | 19.5 | 1.9 | — | 0.8 | — | 66.1 | ○ | ○ |
| 37 | — | 51.8 | — | — | 26.1 | 19.5 | 1.9 | — | — | 0.8 | 66.1 | ○ | ○ |
| 38 | — | — | 51.8 | — | 26.1 | 19.5 | 1.9 | 0.8 | — | — | 66.1 | ○ | ○ |
| 63 | 39.7 | — | — | — | 39.7 | 19.8 | 0.0 | 0.8 | — | — | 47.6 | ○ | ○ |
| 39 | 52.8 | — | — | — | 26.6 | 19.8 | 0.0 | 0.8 | — | — | 67.5 | ○ | ○ |
| 8 | 59.5 | — | — | — | 19.8 | 19.8 | 0.0 | 0.8 | — | — | 67.5 | ○ | ○ |
| 2 | 60.7 | — | — | — | 18.7 | 19.8 | 0.0 | 0.8 | — | — | 67.5 | ○ | ○ |
| 1 | — | — | — | 73.0 | 6.3 | 19.8 | 0.0 | 0.8 | — | — | 67.5 | ○ | ○ |

TABLE 2-1-continued

| Test No. | Components [parts by mass] | | | | | | | | | | | Amount of water based on 100 of composition (parts by mass) | Mixing/press performance | Moldability in mold |
|---|---|---|---|---|---|---|---|---|---|---|---|---|---|---|
| | Starch | | | | Wheat protein | Cellulose | Sodium chloride | Pyrogallol | Phenol | | | | | |
| | Maize | Potato | Rice | Wheat | | | | | Persimmon tannin | Gallic acid | | | | |
| 67 | 47.2 | — | — | — | 47.2 | 4.7 | 0.0 | 0.9 | — | — | 37.7 | ○ | ○ |
| 43 | 62.7 | — | — | — | 31.6 | 4.7 | 0.0 | 0.9 | — | — | 61.3 | ○ | ○ |
| 13 | 70.8 | — | — | — | 23.6 | 4.7 | 0.0 | 0.9 | — | — | 61.3 | ○ | ○ |
| 64 | 43.1 | — | — | — | 43.1 | 12.9 | 0.0 | 0.9 | — | — | 43.1 | ○ | ○ |
| 40 | 57.3 | — | — | — | 28.9 | 12.9 | 0.0 | 0.9 | — | — | 64.7 | ○ | ○ |

TABLE 2-2

| Test No. | Components [parts by mass] | | | | | | | | | | | Amount of water based on 100 of composition (parts by mass) | Mixing/press performance | Moldability in mold |
|---|---|---|---|---|---|---|---|---|---|---|---|---|---|---|
| | Starch | | | | Wheat protein | Cellulose | Sodium chloride | Pyrogallol | Phenol | | | | | |
| | Maize | Potato | Rice | Wheat | | | | | Persimmon tannin | Gallic acid | | | | |
| 10 | 64.7 | — | — | — | 21.6 | 12.9 | 0.0 | 0.9 | — | — | 64.7 | ○ | ○ |
| 153 | 49.5 | — | — | — | 49.5 | 0.0 | 0.0 | 1.0 | — | — | 49.5 | ○ | X |
| 126 | 64.2 | — | — | — | 32.4 | 0.0 | 2.4 | 1.0 | — | — | 53.1 | ○ | X |
| 125 | 65.8 | — | — | — | 33.2 | 0.0 | 0.0 | 1.0 | — | — | 59.4 | ○ | X |
| 103 | 74.3 | — | — | — | 24.8 | 0.0 | 0.0 | 1.0 | — | — | 59.4 | ○ | X |
| 59 | 31.9 | — | — | — | 31.9 | 31.9 | 3.2 | 1.0 | — | — | 79.8 | ○ | ○ |
| 60 | 33.0 | — | — | — | 33.0 | 33.0 | 0.0 | 1.0 | — | — | 82.5 | ○ | ○ |
| 61 | 38.7 | — | — | — | 38.7 | 19.4 | 1.9 | 1.2 | — | — | 48.4 | ○ | ○ |
| 62 | 39.5 | — | — | — | 39.5 | 19.8 | 0.0 | 1.2 | — | — | 49.4 | ○ | ○ |
| 33 | 51.3 | — | — | — | 25.8 | 19.3 | 1.9 | 1.6 | — | — | 65.6 | ○ | ○ |
| 32 | 52.3 | — | — | — | 26.4 | 19.7 | 0.0 | 1.7 | — | — | 66.9 | ○ | ○ |
| 31 | 51.2 | — | — | — | 25.8 | 19.2 | 1.9 | 1.9 | — | — | 65.4 | ○ | ○ |
| 30 | 52.2 | — | — | — | 26.3 | 19.6 | 0.0 | 2.0 | — | — | 66.7 | ○ | ○ |
| 7 | 58.8 | — | — | — | 19.6 | 19.6 | 0.0 | 2.0 | — | — | 54.9 | ○ | ○ |
| 58 | 32.6 | — | — | — | 32.6 | 32.6 | 0.0 | 2.1 | — | — | 81.6 | ○ | ○ |
| 22 | 40.3 | — | — | — | 20.3 | 36.4 | 0.0 | 3.0 | — | — | 54.5 | ○ | ○ |
| 24 | 42.9 | — | — | — | 21.6 | 32.3 | 0.0 | 3.2 | — | — | 45.2 | ○ | ○ |
| 4 | 51.7 | — | — | — | 17.2 | 27.6 | 0.0 | 3.4 | — | — | 58.6 | ○ | ○ |
| 29 | 51.2 | — | — | — | 25.8 | 19.2 | 0.0 | 3.8 | — | — | 53.8 | ○ | ○ |
| 6 | 57.7 | — | — | — | 19.2 | 19.2 | 0.0 | 3.8 | — | — | 65.4 | ○ | ○ |
| 42 | 60.5 | — | — | — | 30.5 | 4.5 | 0.0 | 4.5 | — | — | 59.1 | ○ | ○ |
| 12 | 68.2 | — | — | — | 22.7 | 4.5 | 0.0 | 4.5 | — | — | 59.1 | ○ | ○ |
| 127 | 63.3 | — | — | — | 31.9 | 0.0 | 0.0 | 4.8 | — | — | 52.4 | ○ | X |
| 102 | 71.4 | — | — | — | 23.8 | 0.0 | 0.0 | 4.8 | — | — | 57.1 | ○ | X |
| 52 | 23.8 | — | — | — | 23.8 | 47.6 | 0.0 | 4.8 | — | — | 66.7 | ○ | ○ |
| 21 | 38.0 | — | — | — | 19.1 | 37.1 | 0.0 | 5.7 | — | — | 51.4 | ○ | ○ |
| 57 | 31.3 | — | — | — | 31.3 | 31.3 | 0.0 | 6.3 | — | — | 78.1 | ○ | ○ |
| 3 | 49.2 | — | — | — | 16.4 | 27.9 | 0.0 | 6.6 | — | — | 55.7 | ○ | ○ |
| 26 | 45.9 | — | — | — | 23.1 | 24.1 | 0.0 | 6.9 | — | — | 51.7 | ○ | ○ |

TABLE 2-3

| Test No. | Components [parts by mass] | | | | | | | | | | | Amount of water based on 100 of composition (parts by mass) | Mixing/press performance | Moldability in mold |
|---|---|---|---|---|---|---|---|---|---|---|---|---|---|---|
| | Starch | | | | Wheat protein | Cellulose | Sodium chloride | Pyrogallol | Phenol | | | | | |
| | Maize | Potato | Rice | Wheat | | | | | Persimmon tannin | Gallic acid | | | | |
| 9 | 57.7 | — | — | — | 19.2 | 15.4 | 0.0 | 7.7 | — | — | 53.8 | ○ | ○ |
| 11 | 65.2 | — | — | — | 21.7 | 4.3 | 0.0 | 8.7 | — | — | 56.5 | ○ | ○ |
| 41 | 57.8 | — | — | — | 29.1 | 4.3 | 0.0 | 8.7 | — | — | 56.5 | ○ | ○ |
| 154 | 45.5 | — | — | — | 45.5 | 0.0 | 0.0 | 9.1 | — | — | 45.5 | ○ | X |
| 128 | 60.5 | — | — | — | 30.5 | 0.0 | 0.0 | 9.1 | — | — | 50.0 | ○ | X |
| 101 | 68.2 | — | — | — | 22.7 | 0.0 | 0.0 | 9.1 | — | — | 50.0 | ○ | X |
| 66 | 42.6 | — | — | — | 42.6 | 4.3 | 0.0 | 10.6 | — | — | 34.0 | ○ | ○ |
| 56 | 29.4 | — | — | — | 29.4 | 29.4 | 0.0 | 11.8 | — | — | 73.5 | ○ | ○ |

TABLE 2-3-continued

| | Components [parts by mass] | | | | | | | | Phenol | | | Amount of water based on 100 | | Molda- |
|---|---|---|---|---|---|---|---|---|---|---|---|---|---|---|
| Test | Starch | | | | Wheat | | Sodium | | | Persimmon | Gallic | of composition | Mixing/press | bility |
| No. | Maize | Potato | Rice | Wheat | protein | Cellulose | chloride | Pyrogallol | tannin | acid | (parts by mass) | performance | in mold |
| 51 | 19.6 | — | — | — | 19.6 | 47.1 | 0.0 | 13.7 | — | — | 58.8 | ○ | ○ |
| 54 | 26.3 | — | — | — | 26.3 | 31.6 | 0.0 | 15.8 | — | — | 65.8 | ○ | ○ |
| 55 | 27.8 | — | — | — | 27.8 | 27.8 | 0.0 | 16.7 | — | — | 69.4 | ○ | ○ |
| 65 | 38.5 | — | — | — | 38.5 | 3.8 | 0.0 | 19.2 | — | — | 30.8 | ○ | ○ |
| 155 | 40.0 | — | — | — | 40.0 | 0.0 | 0.0 | 20.0 | — | — | 28.0 | ○ | X |
| 157 | 25.0 | — | — | — | 25.0 | 25.0 | 0.0 | 25.0 | — | — | 62.5 | X | — |

[Strength Test]

With respect to Test Nos. 23 and 27 each having favorable mixing/press performance and favorable moldability in mold in each table described above, each composition was molded and heat-treated at 150° C. to obtain a molded article and then the tensile strength and bending strength of the molded article were measured. The results are shown in Table 3. Differential thermal analysis (not shown) revealed that starch undergoes heating/heat-absorbing reaction at about 50° C. or higher and 170° C. or lower, while wheat protein undergoes heating/heat-absorbing reaction at about 30° C. or higher and 140° C. or lower. When both are heated to higher than 180° C., the color changed to dark brown. Therefore, a heat treatment temperature was set to 150° C.

processed articles obtained from the compositions of other Test Nos. have favorable strength and favorable water resistance.

[Evaluation of Heat Resistance]

Figure 1:
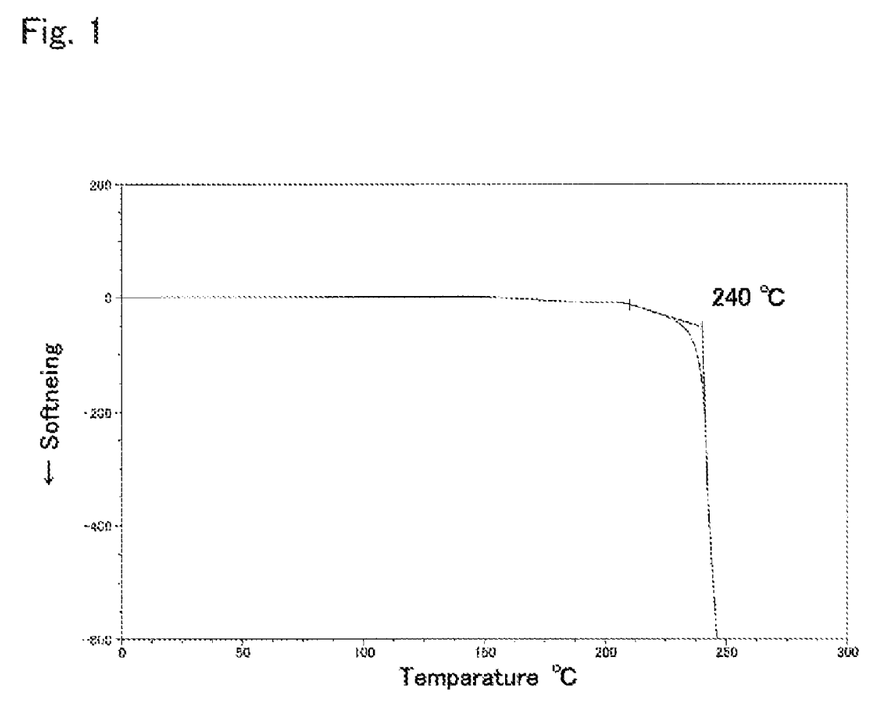
FIG. 1 is a chart showing a softening point of a molded article as an example of the present invention.

Heat resistance of the molded article obtained from the composition of Test No. 23 was evaluated. The heat resistance was evaluated by thermomechanical analysis (TMA). TMA was conducted in accordance with JIS K-7196 "Method of Softening Temperature Test by Thermomechanical Analysis of Thermoplastic Film and Sheet" using TMA120 (atmosphere: nitrogen at 200 mL/min, mode: compression, load: 500 mN) manufactured by Seiko Instruments Inc. The results are shown in FIG. 1. As a result, it was confirmed that the

TABLE 3

| | Components [parts by mass] | | | | | Amount of water based on 100 of composition | Physical property values [MPa] | | | | | | | | | |
|---|---|---|---|---|---|---|---|---|---|---|---|---|---|---|---|---|
| | | | | Sodium | | | Tensile strength | | | | | Bending strength | | | | |
| Test No. | Starch | Protein | Cellulose | chloride | Phenol | (parts by mass) | #1 | #2 | #3 | #4 | AVG | #1 | #2 | #3 | #4 | AVG |
| 23 | 41.3 | 20.8 | 37.3 | 0.0 | 0.6 | 52.8 | 9.6 | 14.1 | 9.4 | 6.7 | 9.9 | 25.2 | 25.7 | 24.7 | 26.3 | 25.5 |
| 27 | 51.8 | 26.1 | 19.5 | 1.9 | 0.8 | 66.1 | 21.0 | 13.5 | 14.9 | 15.7 | 16.3 | 31.1 | 34.0 | 29.3 | 30.3 | 31.2 |

As shown in Table 3, in all molded articles in which pyrogallol and cellulose fibers are used, the tensile strength of 10 MPa or more and the bending strength of 25 MPa or more were obtained. When the composition is blended with sodium chloride, the tensile strength and the bending strength increased, and thus the tensile strength of about 15 Mpa or more and the bending strength of about 30 MPa or more were obtained.

[Evaluation of Water Resistance]

Next, water resistance of the molded articles having satisfactory strength obtained from the compositions of Test Nos. 23 and 27 was evaluated. With respect to Test No. 23, an operation of charging hot water in the molded article and allowing it to stand until the temperature returns to a normal temperature was repeated. Even after repeating the operation four times, the molded article maintained an original shape without causing swelling. With respect to Test No. 27 to which sodium chloride was added, the molded article maintained an original shape for 96 hours or more without causing swelling when immersed in water at a normal temperature. As a result, it was confirmed that both molded articles have water resistance, and thus a container capable of withstanding water and hot water can be obtained. It was also confirmed that molded article exhibits rapid softening at about 240° C. and has heat resistance at about 200° C.

INDUSTRIAL APPLICABILITY

According to the present invention, it is possible to provide a processed biodegradable article having strength and water resistance which have not been heretofore achieved. Particularly, since satisfactory strength can be obtained even if the thickness is decreased, it is possible to provide tablewares such as cups and dishes, which do not cause a sense of incongruity even when touched with the mouth. The composition of the present invention is also excellent in biodegradability because it is composed almost entirely of starch, protein and cellulose fibers, and also exerts less adverse influence on the environment because it is easy to discard. Since molding can be conducted without using a plasticizer, the plasticizer does not ooze and thus a processed biodegradable article having excellent safety is provided.

[FIG. 1]

1: Softening

2: Temperature ° C.

The invention claimed is:

1. A biodegradable composition comprising:
   15% by mass or more and 75% by mass or less of starch,
   5% by mass or more and 50% by mass or less of protein,
   3% by mass or more and 50% by mass or less of cellulose fiber,
   0.5% by mass or more and 20% by mass or less of polyphenols, wherein the polyphenols are any one or two kinds of pyrogallol and gallic acid, and
   0% by mass or more and 5% by mass or less of sodium chloride.

2. The biodegradable composition according to claim 1, wherein a mass ratio of starch/protein is 1 or more and 12 or less.

3. The biodegradable composition according to claim 1, wherein the mass ratio of starch/protein is 1 or more 3 or less, and the content of protein is 15% by mass or more.

4. The biodegradable composition according to claim 1, wherein the cellulose fiber is a natural vegetable fiber or artificial cellulose fiber.

5. A processed biodegradable article comprising the biodegradable composition according to claim 1.

6. The processed biodegradable article according to claim 5, which is any one of a food container, chopsticks, a spoon, a fork, a knife, a bottle, a cup and a dish.

7. A method for producing a processed biodegradable article, the method comprising the steps of:
   kneading the biodegradable composition according to claim 1 after adding water thereto,
   molding and processing the kneaded biodegradable composition, and
   heat-treating the molded article.

8. The method for producing a processed biodegradable article according to claim 7, wherein the molded article is heat-treated at 120° C. or higher and 180° C. or lower.

9. The method for producing a processed biodegradable article according to claim 7, wherein the processed biodegradable article is any one of a food container, chopsticks, a spoon, a fork, a knife, a bottle, a cup and a dish.

* * * * *